(12) United States Patent
Kato et al.

(10) Patent No.: US 11,759,865 B2
(45) Date of Patent: Sep. 19, 2023

(54) TOOL BODY

(71) Applicant: TUNGALOY CORPORATION, Fukushima (JP)

(72) Inventors: Tatsumi Kato, Iwaki (JP); Ryuichi Saji, Iwaki (JP)

(73) Assignee: TUNGALOY CORPORATION, Fukushima (JP)

(*) Notice: Subject to any disclaimer, the term of this patent is extended or adjusted under 35 U.S.C. 154(b) by 24 days.

(21) Appl. No.: 17/570,511

(22) Filed: Jan. 7, 2022

(65) Prior Publication Data

US 2022/0219243 A1    Jul. 14, 2022

(30) Foreign Application Priority Data

Jan. 13, 2021    (JP) .................................. 2021-003636

(51) Int. Cl.
*B23B 27/16* (2006.01)
*B23B 27/04* (2006.01)
*B23B 27/14* (2006.01)

(52) U.S. Cl.
CPC ............ *B23B 27/04* (2013.01); *B23B 27/145* (2013.01); *B23B 27/16* (2013.01); *B23B 2200/0423* (2013.01); *B23B 2205/04* (2013.01)

(58) Field of Classification Search
CPC ....... B23B 27/04; B23B 27/145; B23B 27/16; B23B 2200/0423; B23B 2205/04; B23B 2205/12; B23B 27/1622; B23B 27/1662; B23B 2205/045; B23B 2200/048
See application file for complete search history.

(56) References Cited

U.S. PATENT DOCUMENTS

| | | | |
|---|---|---|---|
| 3,314,126 A * | 4/1967 | Stier | .................... B23B 27/1622 407/105 |
| 3,815,195 A * | 6/1974 | McCreery | ............... F16B 21/16 407/105 |
| 3,908,255 A * | 9/1975 | Faber | ................... B23B 27/1651 407/105 |
| 4,044,440 A | 8/1977 | Stier | |

(Continued)

FOREIGN PATENT DOCUMENTS

| | | |
|---|---|---|
| DE | 3739945 A1 | 6/1989 |
| JP | 2000-512560 A | 9/2000 |

(Continued)

*Primary Examiner* — Sara Addisu
(74) *Attorney, Agent, or Firm* — Studebaker & Brackett PC

(57) ABSTRACT

A tool body in which a cutting insert can be replaced easily is provided. The tool body which fixes the indexable cutting insert includes an insert mounting seat which is provided on a first surface of the tool body, a clamp member which binds the cutting insert placed on the insert mounting seat, and an operating member which operates the clamp member. The operating member can lower the clamp member from the first surface toward a second surface of the tool body on an opposite side thereof to the first surface and can raise the clamp member from the second surface toward the first surface. The clamp member has a hook portion which is brought into contact with a diameter reducing portion formed on an inner peripheral surface of a mounting hole of the cutting insert in a state where the clamp member is lowered.

20 Claims, 8 Drawing Sheets

(56) References Cited

U.S. PATENT DOCUMENTS

| | | | | |
|---|---|---|---|---|
| 4,632,593 | A * | 12/1986 | Stashko | B23B 27/1622 |
| | | | | 407/104 |
| 5,938,377 | A | 8/1999 | Jordberg et al. | |
| 9,868,157 | B2 * | 1/2018 | Choi | B23C 5/2208 |
| 10,105,760 | B2 * | 10/2018 | Joo | B23B 27/1662 |
| 11,141,796 | B2 * | 10/2021 | Shaheen | B23B 27/1611 |
| 2011/0274507 | A1 * | 11/2011 | Park | B23B 27/1662 |
| | | | | 407/107 |
| 2012/0082522 | A1 | 4/2012 | Hecht et al. | |
| 2013/0142579 | A1 | 6/2013 | Saji | |
| 2017/0341152 | A1 | 11/2017 | Ida | |
| 2021/0031281 | A1 * | 2/2021 | Raboach | B23B 27/1614 |
| 2022/0219245 | A1 * | 7/2022 | Kato | B23B 27/1677 |

FOREIGN PATENT DOCUMENTS

| | | | |
|---|---|---|---|
| JP | 2013-538702 | A | 10/2013 |
| WO | 2012/153737 | A1 | 11/2012 |
| WO | 2016/186113 | A1 | 11/2016 |

\* cited by examiner

TOOL BODY

CROSS-REFERENCES TO RELATED APPLICATIONS

This application relates to and claims priority from Japanese Patent Application No. 2021-003636, filed on Jan. 13, 2021, the entire disclosure of which is incorporated herein by reference.

BACKGROUND

Field

The present invention relates to a tool body which fixes an indexable cutting insert.

Description of Related Art

A tuning tool includes an indexable cutting insert and a tool body which fixes the cutting insert. The cutting insert is fixed to an insert mounting seat of the tool body by a clamp screw or the like inserted from one of end surfaces to the other of the end surfaces (see WO 2016/186113, for example).

SUMMARY

When the cutting insert is to be fixed by the clamp screw, a left-hand screw, instead of a right-hand screw, is used in some cases depending on a direction of cutting resistance that the cutting insert receives. When the cutting insert described in WO 2016/186113 is mounted on a comb-shaped flat turret of an automatic lathe so as to be used for grooving, if the fixing is implemented by the right-hand screw, there is a concern that the screw is loosened by cutting resistance and thus, the fixing is implemented by the left-hand screw in some cases. If the left-hand screws and the left-hand screws are mixed at a manufacture site, it is necessary to confirm at each use whether the direction is for tightening or loosening the screw, whereby a labor of a worker is increased.

Moreover, in a state where the tuning tool is mounted on the comb-shaped flat turret, the worker cannot easily withdraw the clamp screw from a direction opposed to the insert mounting seat since other tuning tools or inner walls of the machine become obstruction in some cases. In a case where a clearance between the inner wall of the machine and the insert mounting seat is extremely small, the tuning tool is removed from the comb-shaped flat turret and the cutting insert is replaced and then, the tuning tool is mounted on the comb-shaped flat turret. Alternatively, by using a clamp screw in which a wrench hole is formed not only in a head part but also at a distal end of a shaft part, the shaft part exposed to a side surface on the opposite side to the side surface on which the insert mounting seat is located is rotated by a wrench, whereby the cutting insert is replaced.

In the latter case, since the clamp screw can be removed from the opposite side to the insert mounting seat, there is a merit that the cutting insert can be replaced even if the tool body is not removed from the comb-shaped tool rest. On the other hand, in the latter case, when the cutting insert is to be removed from the tool body, there is a concern that the clamp screw is dropped together with the used cutting insert into a spot, which is located below the comb-shaped tool rest in the machine and where chips are treated/discarded, and lost in some cases.

Therefore, the present invention has an object to provide a tool body in which a cutting insert can be easily replaced.

A tool body according to one aspect of the present invention is a tool body fixing an indexable cutting insert and has an insert mounting seat which is provided on a first surface of the tool body, a clamp member which binds the cutting insert placed on the insert mounting seat, and an operating member which operates the clamp member. The operating member can lower the clamp member in a direction from the first surface toward a second surface of the tool body on an opposite side thereof to the first surface and can raise the clamp member from the second surface toward the first surface. The clamp member has a hook portion brought into contact with a diameter reducing portion formed on an inner peripheral surface of a mounting hole of the cutting insert in a state where the clamp member is lowered.

According to this aspect, by raising the clamp member and by having a clearance between the hook portion and the cutting insert, the cutting insert can be removed. Since there is no need to completely withdraw the clamp member from the insert mounting seat at each replacement of the cutting insert, fall of the clamp member during a replacement work for the cutting insert can be prevented. Therefore, the tool body in which the cutting insert can be easily replaced can be provided.

In the aforementioned aspect, at least a part of the operating member may be exposed to the second surface side.

According to this aspect, the cutting insert can be replaced by an operation from the second surface side opposite to the insert mounting seat. The cutting insert in which the cutting insert can be easily replaced even by a wall or the like where a hand cannot easily reach the insert mounting seat can be provided.

In the aforementioned aspect, in the state where the clamp member binds the cutting insert, it may be so constituted that the clamp member includes a protruding portion located closer to the first surface side than a bottom surface of the cutting insert and an embedded portion located closer to the second surface side than the bottom surface of the cutting insert, a hook portion is provided on the protruding portion, a tail portion protruding toward an opposite side to the hook portion, when seen from the first surface side, is provided on the embedded portion, the insert mounting seat has a pocket which accommodates the embedded portion, and an inclined surface which supports the tail portion is formed in the pocket.

According to this aspect, when the clamp member is lowered, the clamp member is elastically deformed slightly, and the hook portion is rotationally moved with the tail portion as a fulcrum. Since contact between the hook portion and the cutting insert is stable, the tool body can bind the cutting insert more reliably.

In the aforementioned aspect, the tail portion may be constituted by a part of a columnar surface or a part of a spherical surface at a portion supported by the inclined surface.

According to this aspect, since a lower surface of the tail portion and the inclined surface are in point-contact, a position of the fulcrum is stabilized. Since the hook portion is brought into contact with the cutting insert stably in compliance with a design, the tool body can bind the cutting insert more reliably.

In the aforementioned aspect, in the clamp member, a female thread having an axis in parallel with a center axis of the mounting hole of the cutting insert may be formed, and a male thread screwed with the female thread may be formed in the operating member.

According to this embodiment, a simple constitution of the male thread and the female thread can constitute the operating member which lowers/raises the clamp member. The cutting insert is not directly fixed by the male thread but fixed through the clamp member and thus, the direction of the screw can be selected not depending on the direction of cutting resistance.

In the aforementioned aspect, it may be so constituted that the operating member has the shaft portion on which the male thread is formed and a head portion provided on one end of the shaft portion and formed having a diameter larger than that of the shaft portion, and a seat surface of the head portion which connects an outer edge of the shaft portion and an outer edge of the head portion is formed having a conical shape or a semispherical shape, and a recess portion having a shape following the seat surface of the head portion is formed on the second surface.

According to this aspect, as the operating member which is a screw member is tightened, the head portion of the screw is guided to the recess portion, and the shaft portion of the screw is positioned with respect to the insert mounting seat. Thus, the clamp member connected to the operating member and the cutting insert placed on the insert mounting seat can be positioned easily.

In the aforementioned aspect, the hook portion has a center portion and a first end portion as well as a second end portion located on opposite sides to each other, with the center portion between them, and while the center portion is not in contact with the cutting insert, the first end portion and the second end portion may be brought into contact with the cutting insert.

The shape of the distal end of the hook portion and the shape of the mounting hole of the cutting insert have slight variation allowed as a tolerance. According to this aspect, even if the shapes of the hook portion and the mounting hole are slightly varied, since the hook portion is brought into contact with the inner peripheral surface of the diameter reducing portion reliably at two points, binding of the cutting insert by the clamp member is stabilized.

According to the present invention, the tool body in which the cutting insert can be replaced easily can be provided.

DETAILED DESCRIPTION

Figure 1:
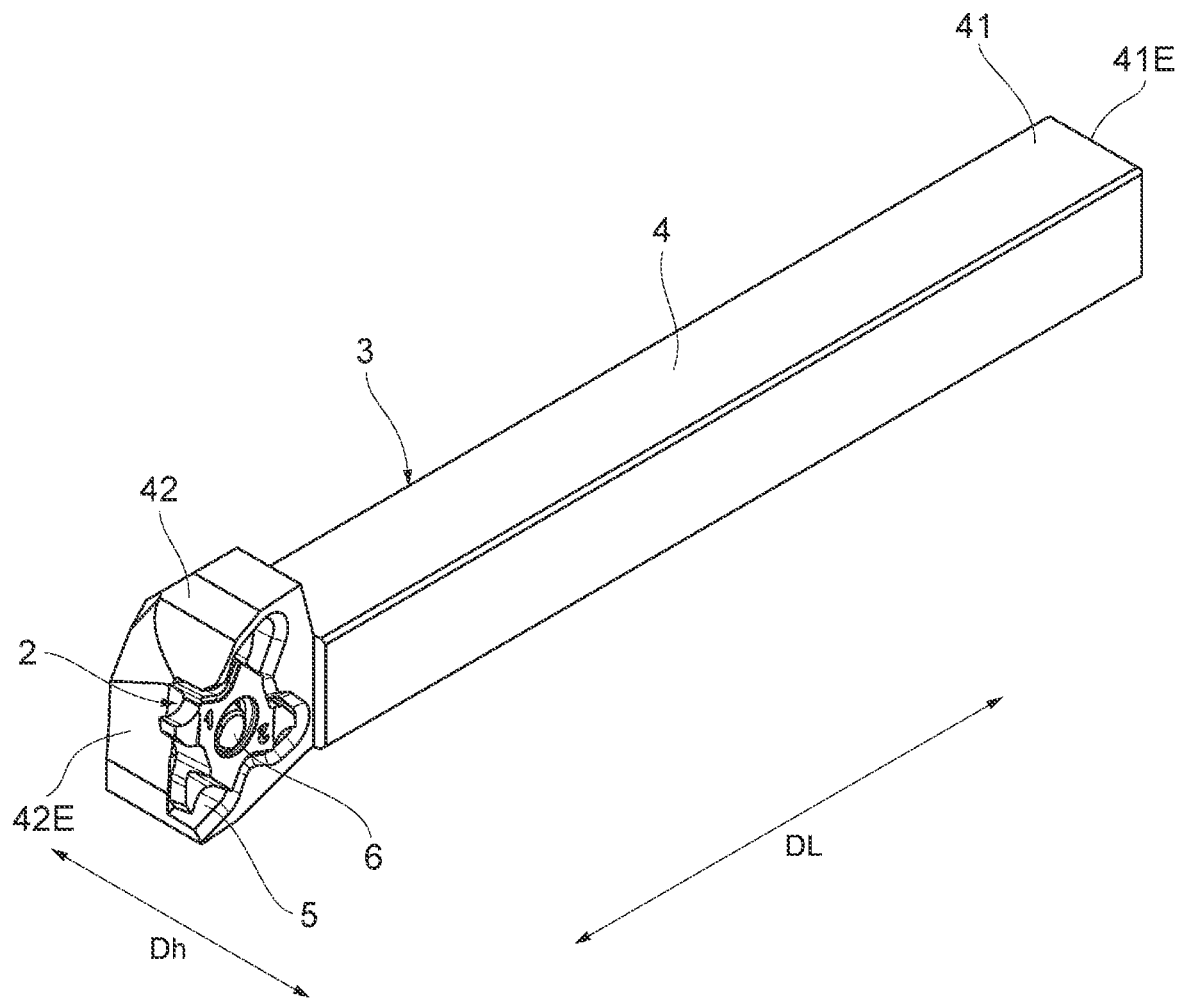
FIG. 1 is a perspective view illustrating an example of a tuning tool according to an embodiment of the present invention.

A preferred embodiment of the present invention will be described by referring to the attached figures. In each figure, those given the same signs have the same or similar constitutions. Hereinafter, each constitution will be described in detail by referring to the figures. FIG. 1 is a perspective view illustrating an example of a tuning tool 1 according to an embodiment of the present invention. The tuning tool 1 includes an indexable cutting insert 2 and a tool body 3 which fixes the cutting insert 2. In the illustrated example, the tuning tool 1 is constituted as a grooving tool for an automatic lathe fixed to a comb-shaped tool rest.

Figure 2:
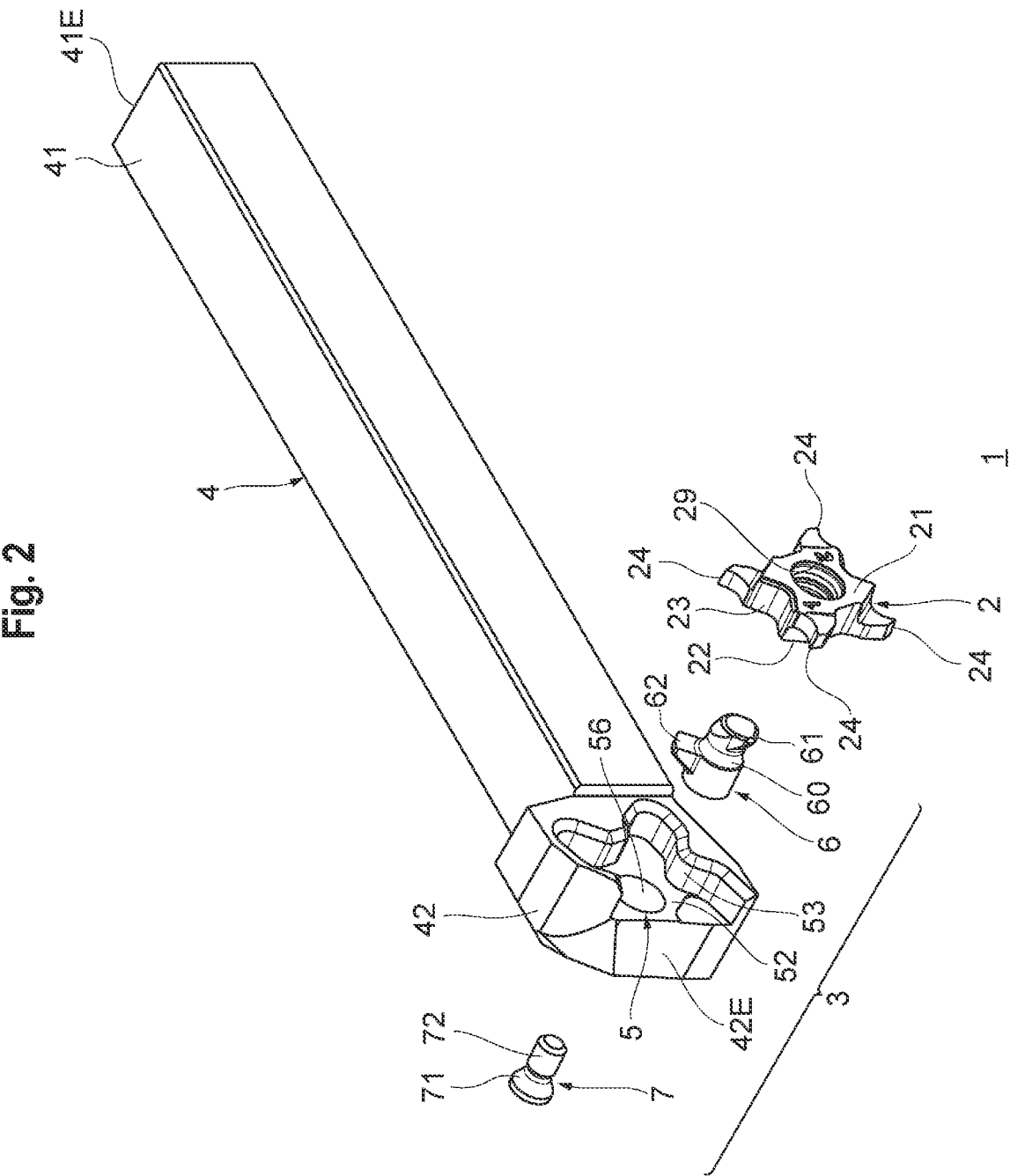
FIG. 2 is a perspective view illustrating the tuning tool shown in FIG. 1 in an exploded manner.

FIG. 2 is a perspective view illustrating the tuning tool 1 shown in FIG. 1 in an exploded manner. As shown in FIG. 2, a tool body 3 includes a holder 4, a clamp member 6 mounted on the holder 4, and an operating member 7. The holder 4 is formed having a rod shape extending from a base end 41E to a distal end 42E on a side opposite to the base end 41E.

In the distal end portion 42 of the holder 4 including the distal end 42E and a portion in the vicinity thereof, an insert mounting seat 5 on which the cutting insert 2 is placed is provided. A portion closer to the base end 41E side than the distal end portion 42 is constituted as a shank which can be fixed to a machine tool. The insert mounting seat 5 has a seating surface 52 which is brought into contact with a bottom surface (a second end surface 22, for example) of the cutting insert 2 and binds the cutting insert 2, which will be described later, and a wall surface 53 which is brought into contact with a peripheral side surface 23 of the cutting insert 2 and binds the cutting insert 2, which will be described later.

Figure 3:
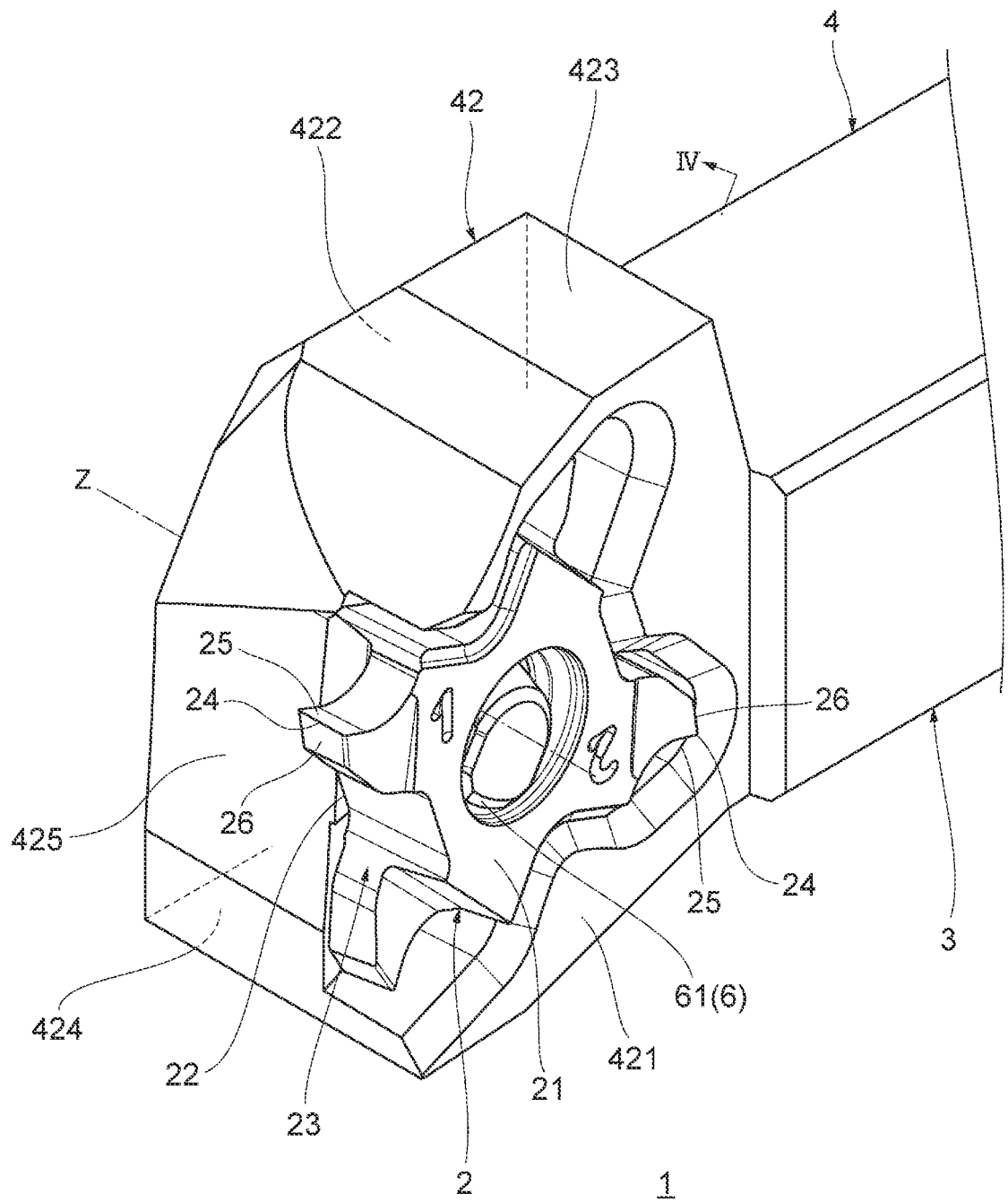
FIG. 3 is a perspective view illustrating a distal end portion shown in FIG. 1 in an enlarged manner.

FIG. 3 is a perspective view illustrating the distal end portion 42 shown in FIG. 1 in an enlarged manner. As shown in FIG. 3, the distal end portion 42 has a distal end surface 425 and first to fourth surfaces 421, 422, 423, and 424 faced with the distal end surface 425. The aforementioned distal end 42E of the holder 4 is located on the distal end surface 425. The aforementioned insert mounting seat 5 is provided on the first surface 421. The second surface 422 is located on a side opposite to the first surface 421. The third and fourth surfaces 423 and 424 connect the first surface 421 and the second surface 422.

In the following description, a direction from the first surface 421 to the second surface 422 in a height direction Dh of the holder 4 is referred to as downward, and a direction from the second surface 422 to the first surface 421 in the height direction Dh is referred to as upward in some cases. The height direction (up-and-down direction) Dh of the holder 4 is a direction connecting the first surface 421 and the second surface 422 of the distal end portion 42, and it does not necessarily have to be orthogonal to a longitudinal direction DL of the holder 4 connecting the base end 41E and the distal end 42E of the holder 4.

As shown in FIG. 3, the clamp member 6 binds the cutting insert 2 placed on the insert mounting seat 5. The cutting insert 2 has a first end surface 21, a second end surface 22 on a side opposite to the first end surface 21, a peripheral side surface 23 connecting the first end surface 21 and the second end surface 22, and a mounting hole 29 penetrating the first end surface 21 and the second end surface 22. The peripheral side surface 23 includes a cutting edge 24 which cuts an workpiece material to be cut and a rake face 25 as well as a flank 26 faced with the cutting edge 24.

At least a part of the second end surface 22 is constituted as a bottom surface supported by the seating surface 52 of the insert mounting seat 5. In the illustrated example, the first end surface 21 and the second end surface 22 have substantially the same shape. Thus, by inverting the cutting insert 2 upside down so that the first end surface 21 becomes the bottom surface, the cutting insert 2 can be attached to the insert mounting seat 5.

In the illustrated example, the peripheral side surface 23 is formed symmetrically by 180 degrees to a center axis Z of the mounting hole 29. The peripheral side surface 23 includes four cutting edges 24 (see FIG. 8) in total, that is, two cutting edges 24 which can be used when the cutting insert 2 is attached to the insert mounting seat 5 with the second end surface 22 as the bottom surface and two cutting edges 24 which can be used when the cutting insert 2 is attached to the insert mounting seat 5 with the first end surface 21 as the bottom surface.

Figure 4:
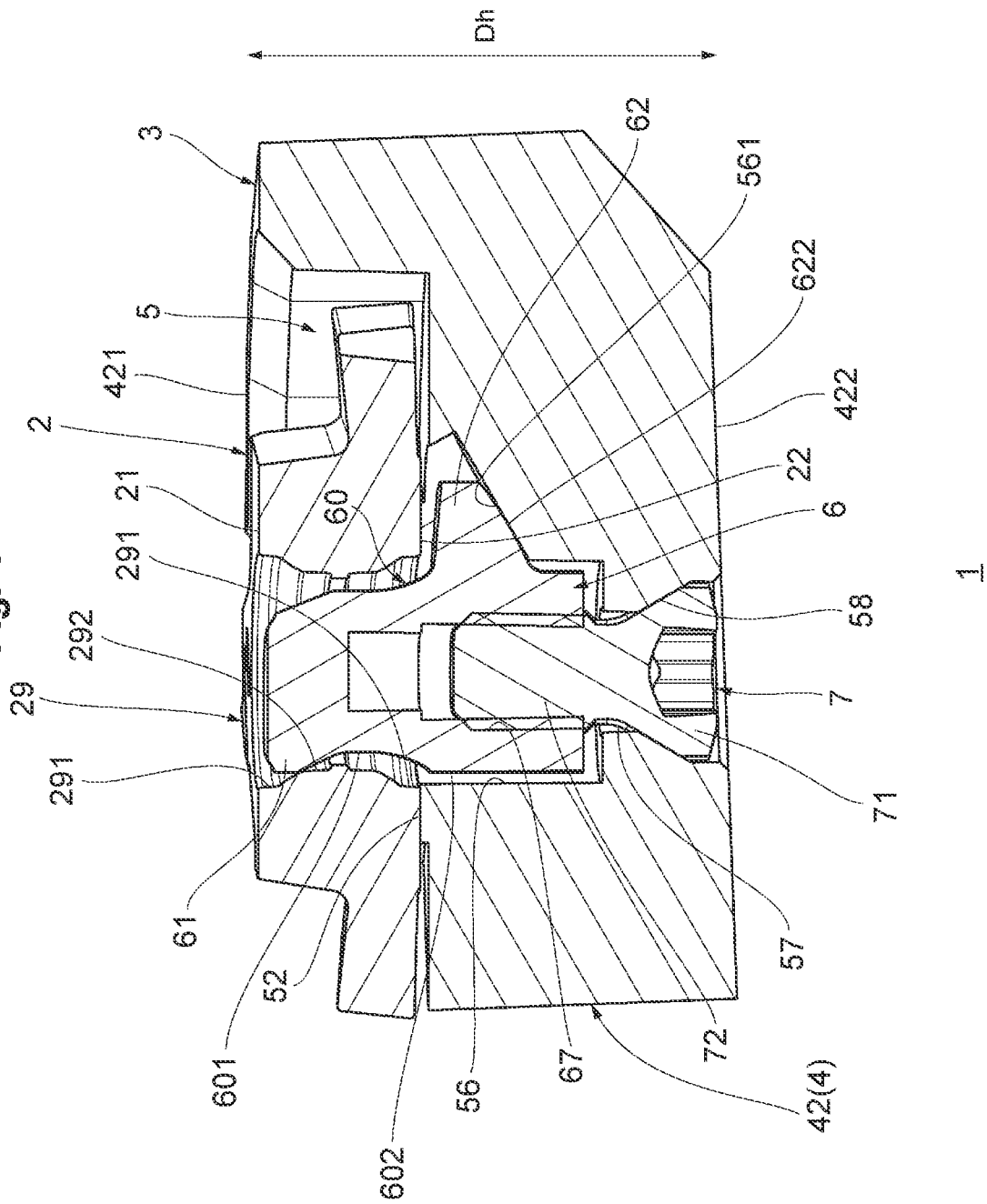
FIG. 4 is a sectional view in which the distal end portion shown in FIG. 3 is cut on a symmetry plane of a clamp member.

FIG. 4 is a sectional view in which the distal end portion shown in FIG. 3 is cut on the symmetry plane of the clamp member 6. A position of the section is indicated by a IV-IV line in FIG. 3. As shown in FIG. 4, an inner peripheral surface of the mounting hole 29 of the cutting insert 2 has a large diameter portion 291 and a diameter reducing portion 292 whose inner diameter is smaller than that of the large diameter portion 291. In the illustrated example, the large diameter portion 291 is formed on each of the first end surface 21 and the second end surface 22, and the diameter reducing portion 292 is formed in an intermediate portion of the first end surface 21 and the second end surface 22.

Figure 5:
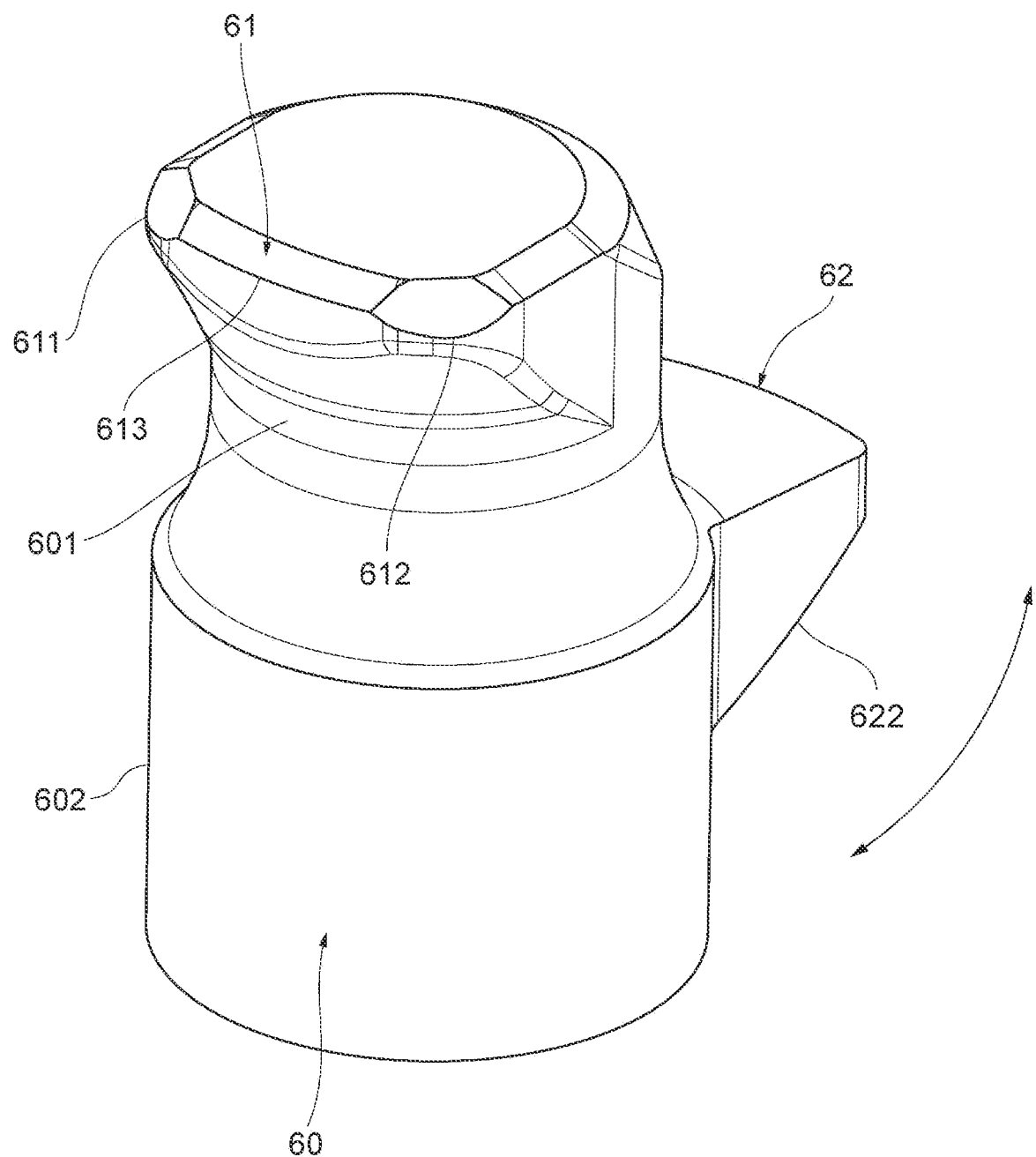
FIG. 5 is a perspective view of the clamp member shown in FIG. 4 when seen from a hook portion side.

The clamp member 6 has a hook portion 61 in contact with the diameter reducing portion 292 and a tail portion 62 in contact with the insert mounting seat 5. FIG. 5 is a perspective view of the clamp member 6 illustrated in FIG. 4 when seen from the hook portion 61 side. As shown in FIG. 5, the clamp member 6 has a columnar barrel portion 60 extending in the height direction Dh of the holder 4. The aforementioned hook portion 61 and the tail portion 62 are provided on the barrel portion 60.

Figure 6:
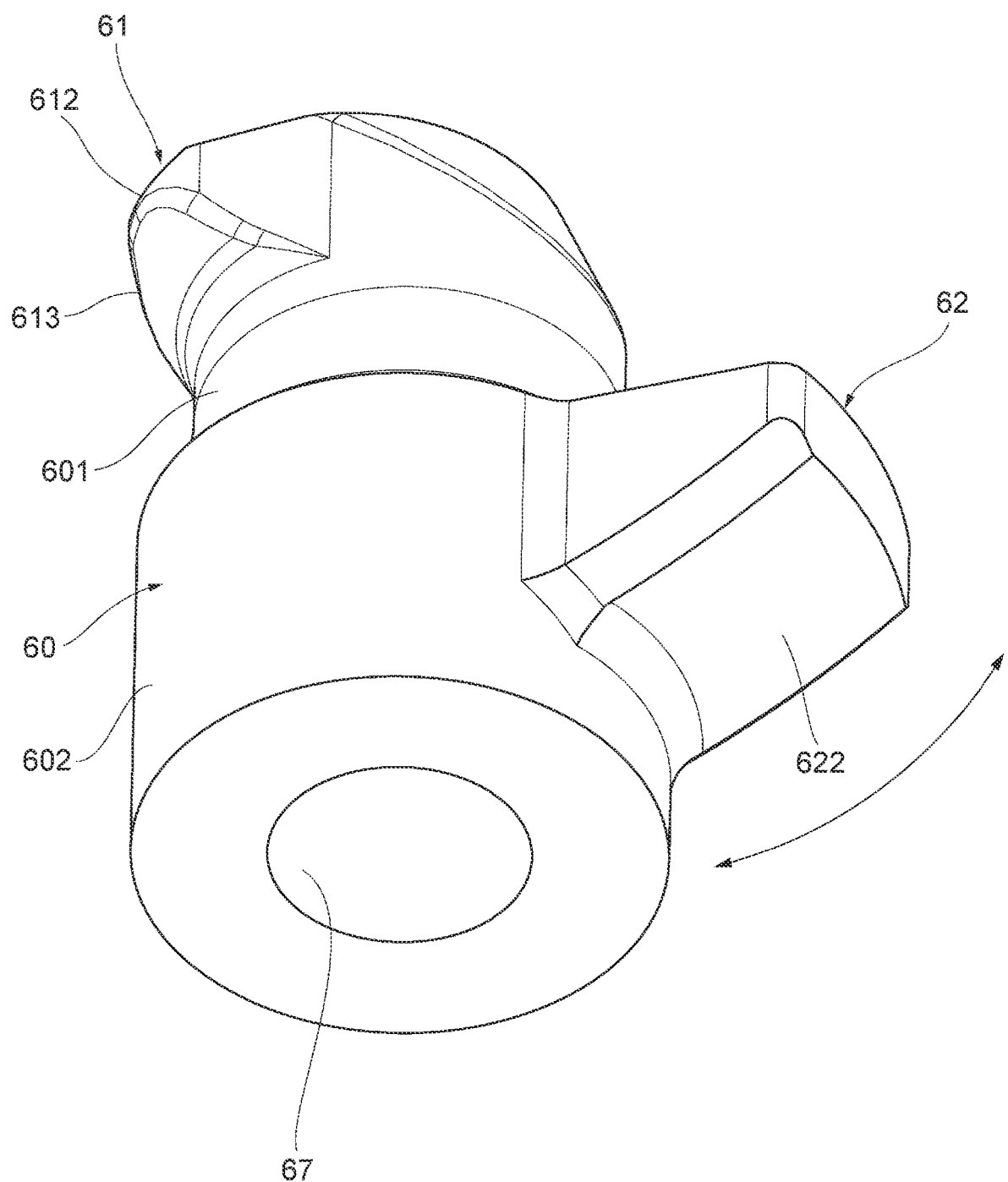
FIG. 6 is a perspective view of the clamp member shown in FIG. 4 when seen from a tail portion side.

FIG. 6 is a perspective view of the clamp member 6 illustrated in FIG. 4 when seen from the tail portion 62 side. In the illustrated example, a female thread (screw hole) 67 is formed on a bottom surface of the barrel portion 60. The female thread 67 is formed so that an axis thereof is in parallel with the center axis Z of the mounting hole 29 (shown in FIG. 4) of the cutting insert 2. As shown in FIG. 6, a lower surface 622 of the tail portion 62 is gently curved so as to expand downward. In the illustrated example, the lower surface 622 has a center axis perpendicular to the symmetry plane of the clamp member 6 and a is constituted by a part of the columnar surface with a large radius of a curvature circle. The lower surface 622 may be constituted by a part of a spherical surface with a large radius of the curvature circle.

Figure 7:
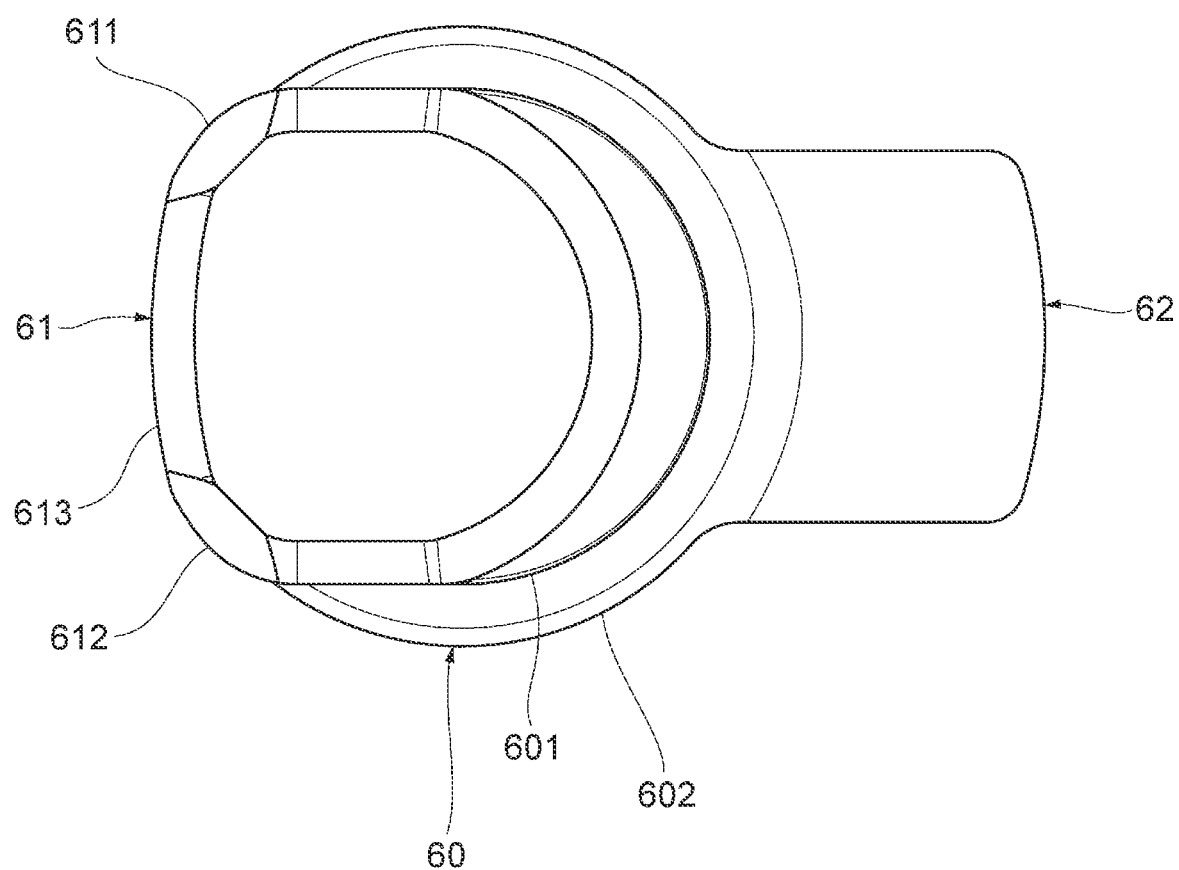
FIG. 7 is a plan view of the clamp member shown in FIG. 4 when seen from a first surface side.

FIG. 7 is a plan view of the clamp member 6 illustrated in FIG. 4 when seen from the first surface 421 side of the distal end portion 42 of the holder 4. As shown in FIG. 7, when seen from the first surface 421 side, that is, when seen from above, the tail portion 62 protrudes toward the side opposite to the hook portion 61. The distal end of the hook portion 61 has a center portion 613 and first and second end portions 611 and 612 located on sides opposite to each other with the center portion 613 between them.

The hook portion 61 is formed with the first and second end portions (both end portions) 611 and 612 extending angularly so that the center portion 613 is not brought into contact with the cutting insert 2, while the first and second end portions 611 and 612 are brought into contact with the diameter reducing portion 292 of the cutting insert. In more detail, an outer shape of the distal end of the hook portion 61 when seen from the first surface 421 side is formed such that the center portion 613 sandwiched by the first and second end portions 611 and 612 has an arc shape whose radius of the curvature circle is larger than a protruding portion 601 of the barrel portion 60 which will be described later, and each of the first and second end portions 611 and 612 is formed having the arc shape whose radius of the curvature circle is smaller than the protruding portion 601.

By referring to FIG. 4 again, the operating member 7 will be described. The operating member 7 can lower the clamp member 6 from the first surface 421 toward the second surface 422 in the height direction Dh of the holder 4 or raise the clamp member 6 from the second surface 422 toward the first surface 421. In the illustrated example, the operating member 7 is constituted as a screw member having a shaft portion 72 on which a male thread is formed and a head portion 71 provided on one end of the shaft portion 72 and having a diameter larger than that of the shaft portion 72. The male thread of the shaft portion 72 is formed so as to be screwed with the female thread 67 of the clamp member 6.

Note that the operating member 7 is not limited to a screw member screwed with the clamp member 6. It may be a worm gear or other transmission mechanisms as long as it can lower/raise the clamp member 6. In the illustrated example, in the screw member, a seat surface of the head portion 71 which connects an outer edge of the shaft portion 72 and the outer edge of the head portion 71 is formed having a conical shape. The shape of the seat surface may be semispherical. On the second surface 422 of the holder 4, a recess portion 58 having a shape following the seat surface of the head portion 71 is formed.

The hook portion 61 described above is brought into contact with the diameter reducing portion 292 formed inside the mounting hole 29 of the cutting insert 2 in the state where the clamp member 6 has been lowered and is separated from the diameter reducing portion 292 in the state where the clamp member 6 is raised. The aforementioned barrel portion 60 includes the protruding portion 601 located closer to the first surface 421 side than the bottom surface of the cutting insert 2 (the second end surface 22 in the illustrated example) and an embedded portion 602 located closer to the second surface 422 side than the bottom surface in the state where the clamp member 6 binds the cutting insert 2.

The hook portion 61 is provided on the protruding portion 601, and the tail portion 62 and the female thread 67 are provided on the embedded portion 602. In the protruding portion 601, a portion on a side opposite to the hook portion 61 is formed as an inclined surface which gets closer to the hook portion 61 as it goes from the second surface 422 side toward the first surface 421 side. Though the hook portion 61 protrudes to the radial direction of the mounting hole 29 of the cutting insert 2 in the protruding portion 601, the portion on the opposite side is formed as the inclined surface and thus, the distal end portion on the first surface 421 side of the protruding portion 601 does not have an expanded shape. Therefore, the hook portion 61 can be smoothly inserted/removed with respect to the mounting hole 29. In the state where the clamp member 6 is loosened, the cutting insert 2 can be removed from the insert mounting seat or the cutting insert 2 can be mounted on the insert mounting seat 5.

In the insert mounting seat 5, a pocket 56 which accommodates the embedded portion 602 is provided. In the pocket 56, an inclined surface 561 which supports a lower surface 622 of the tail portion 62 and a through hole 57 penetrating from a bottom surface of the pocket 56 to the second surface 422 is formed. As described above, the lower surface 622 of the tail portion 62 is expanded downward. On the other hand, the inclined surface 561 of the insert mounting seat 5 is formed having a planar shape. Therefore, a contact area between the lower surface 622 and the inclined surface 561 is small. As shown in FIG. 4, at least a part of the operating member 7 is exposed to the second surface 422 side. In the illustrated example, the shaft portion 72 of the operating member 7 is inserted through the through hole 57 of the pocket 56, and the head portion 71 of the operating member 7 is exposed to the second surface 422 side.

Figure 8:
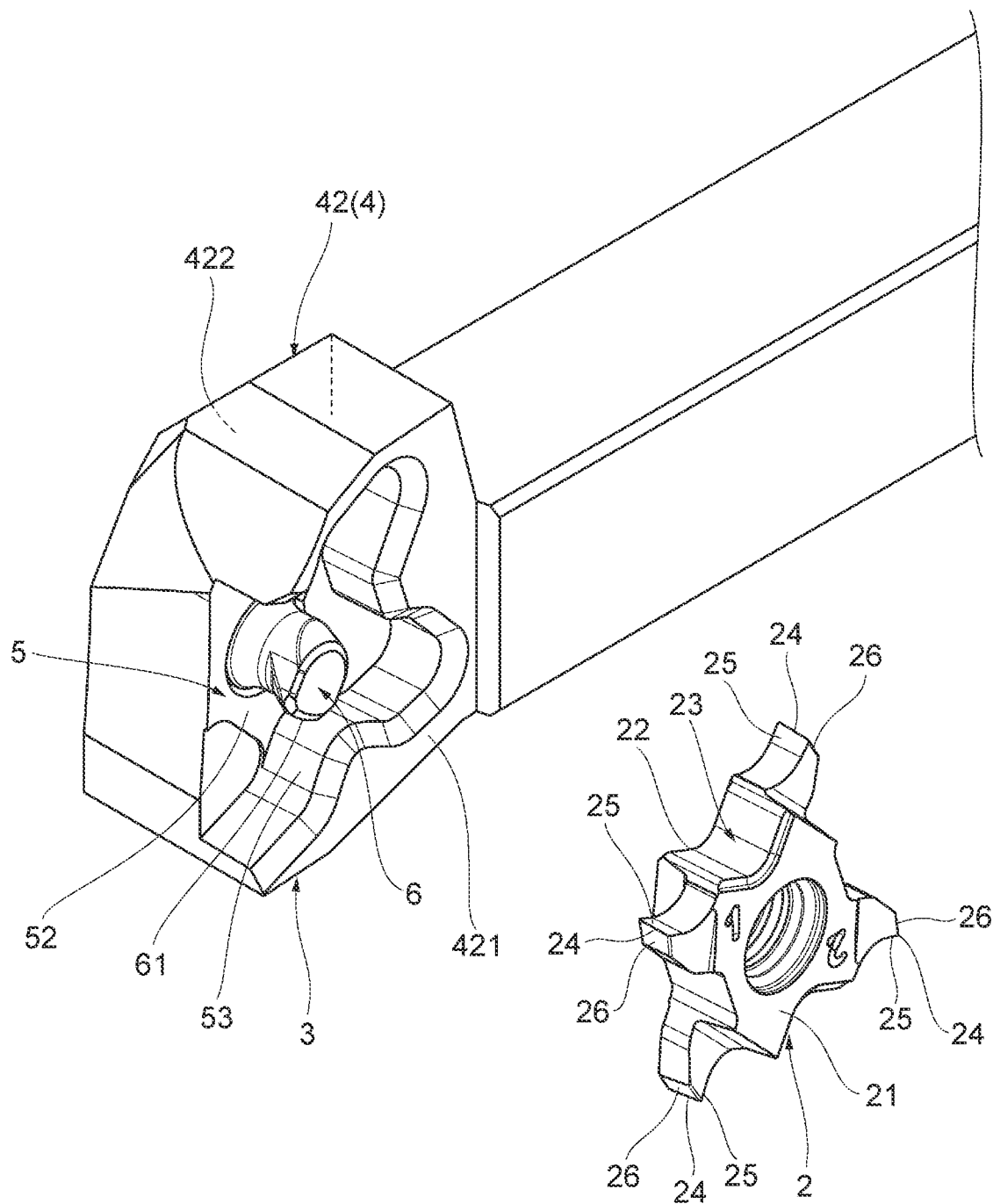
FIG. 8 is a perspective view illustrating a state where binding is loosened and a cutting insert is removed.

According to the tool body 3 of this embodiment constituted as above, by using the clamp member 6 raised to the first surface 421 side and lowered to the second surface 422 side, the cutting insert 2 can be bound. FIG. 8 is a perspective view illustrating a state where the binding is loosened, and the cutting insert 2 is removed. By raising the clamp member 6 and loosening the binding, the cutting insert 2 can be removed or mounted and thus, as shown in FIG. 8, the clamp member 6 or the operating member 7 does not have to be removed from the holder 4 at each replacement of the cutting insert 2. As compared with a screw-on type, there is no concern that the clamp screw is removed and lost, and the cutting insert 2 can be easily replaced even in a narrow space.

As shown in FIG. 4, since the operating member 7 which lowers/raises the clamp member 6 is exposed to the second surface 422 side opposite to the insert mounting seat 5, the cutting insert 2 can be replaced by an operation from the second surface 422 side. Even in the case where the cutting insert 2 cannot be replaced easily from the direction opposed to the insert mounting seat 5 due to obstruction by the comb-shaped tool rest or the like, the cutting insert 2 can be replaced without removing the tool body 3 from the comb-shaped tool rest.

When the clamp member 6 is rotationally moved, as shown in FIG. 4, since the rotation center is positioned by the tail portion 62 which is used as a fulcrum, a position where the hook portion 61 is brought into contact with the cutting insert 2 is stabilized. As shown in FIG. 6, since the lower surface 622 of the tail portion 62 is expanded, and the contact area with the inclined surface 561 of the insert mounting seat 5 is small, the rotation center of the clamp member 6 can be easily disposed in a narrow region as designed.

The embodiment described above is for facilitating understanding of the present invention and is not intended to interpret the present invention in a limited manner. Each of the elements included in the embodiment, dispositions, materials, conditions, shapes, sizes and the like thereof are not limited to the illustrated but can be changed as appropriate. Moreover, constitutions illustrated in different embodiments can be partially substituted or combined.

What is claimed is:

1. A tool body fixing an indexable cutting insert, the tool body comprising:
   an insert mounting seat which is provided on a first surface of the tool body;
   a clamp member which binds the cutting insert placed on the insert mounting seat; and
   an operating member which can lower the clamp member in a direction from the first surface toward a second surface of the tool body on an opposite side thereof to the first surface and can raise the clamp member from the second surface toward the first surface, wherein
   the clamp member has a hook portion which is brought into contact with a diameter reducing portion formed on an inner peripheral surface of a mounting hole of the cutting insert in a state where the clamp member is lowered,
   in the clamp member, a female thread having an axis in parallel with a center axis of the mounting hole of the cutting insert is formed, and
   a male thread screwed with the female thread is formed in the operating member.

2. The tool body according to claim 1, wherein
   at least a part of the operating member is exposed to the second surface side.

3. The tool body according to claim 1, wherein
   in a state where the clamp member binds the cutting insert, the clamp member includes a protruding portion located closer to the first surface side than a bottom surface of the cutting insert and an embedded portion located closer to the second surface side than the bottom surface,
   the hook portion is provided on the protruding portion,
   a tail portion protruding toward an opposite side to the hook portion, when seen from the first surface side, is provided on the embedded portion, and
   the insert mounting seat has a pocket which accommodates the embedded portion, and an inclined surface which supports the tail portion is formed in the pocket.

4. The tool body according to claim 2, wherein
   in a state where the clamp member binds the cutting insert, the clamp member includes a protruding portion located closer to the first surface side than a bottom surface of the cutting insert and an embedded portion located closer to the second surface side than the bottom surface,
   the hook portion is provided on the protruding portion,
   a tail portion protruding toward an opposite side to the hook portion, when seen from the first surface side, is provided on the embedded portion, and
   the insert mounting seat has a pocket which accommodates the embedded portion, and an inclined surface which supports the tail portion is formed in the pocket.

5. The tool body according to claim 3, wherein
   the tail portion is constituted by a part of a columnar surface or a part of a spherical surface at a portion supported by the inclined surface.

6. The tool body according to claim 4, wherein
   the tail portion is constituted by a part of a columnar surface or a part of a spherical surface at a portion supported by the inclined surface.

7. The tool body according to claim 1, wherein
   the operating member has a shaft portion on which the male thread is formed and a head portion provided on one end of the shaft portion and formed having a diameter larger than that of the shaft portion,
   a seat surface of the head portion which connects an outer edge of the shaft portion and an outer edge of the head portion to each other is formed having a conical shape or a semispherical shape, and
   a recess portion having a shape following the seat surface of the head portion is formed on the second surface.

8. The tool body according to claim 1, wherein
   the hook portion has a center portion and a first end portion as well as a second end portion located on opposite sides to each other, with the center portion therebetween, and the center portion is not brought into contact with the cutting insert, while the first end portion and the second end portion are brought into contact with the cutting insert.

9. The tool body according to claim 2, wherein
   the hook portion has a center portion and a first end portion as well as a second end portion located on opposite sides to each other, with the center portion therebetween, and the center portion is not brought into contact with the cutting insert, while the first end portion and the second end portion are brought into contact with the cutting insert.

10. The tool body according to claim 3, wherein the hook portion has a center portion and a first end portion as well as a second end portion located on opposite sides to each other, with the center portion therebetween, and the center portion is not brought into contact with the cutting insert, while the first end portion and the second end portion are brought into contact with the cutting insert.

11. The tool body according to claim 4, wherein the hook portion has a center portion and a first end portion as well as a second end portion located on opposite sides to each other, with the center portion therebetween, and the center portion is not brought into contact with the cutting insert, while the first end portion and the second end portion are brought into contact with the cutting insert.

12. The tool body according to claim 5, wherein the hook portion has a center portion and a first end portion as well as a second end portion located on opposite sides to each other, with the center portion therebetween, and the center portion is not brought into contact with the cutting insert, while the first end portion and the second end portion are brought into contact with the cutting insert.

13. The tool body according to claim 1, wherein the hook portion has a center portion and a first end portion as well as a second end portion located on opposite sides to each other, with the center portion therebetween, and the center portion is not brought into contact with the cutting insert, while the first end portion and the second end portion are brought into contact with the cutting insert.

14. The tool body according to claim 7, wherein the hook portion has a center portion and a first end portion as well as a second end portion located on opposite sides to each other, with the center portion therebetween, and the center portion is not brought into contact with the cutting insert, while the first end portion and the second end portion are brought into contact with the cutting insert.

15. A tool body fixing an indexable cutting insert, the tool body comprising:
an insert mounting seat which is provided on a first surface of the tool body;
a clamp member which binds the cutting insert placed on the insert mounting seat; and
an operating member which can lower the clamp member in a direction from the first surface toward a second surface of the tool body on an opposite side thereof to the first surface and can raise the clamp member from the second surface toward the first surface, wherein
the clamp member has a hook portion which is brought into contact with a diameter reducing portion formed on an inner peripheral surface of a mounting hole of the cutting insert in a state where the clamp member is lowered, and
the hook portion has a center portion and a first end portion as well as a second end portion located on opposite sides to each other, with the center portion therebetween, and the center portion is not brought into contact with the cutting insert, while the first end portion and the second end portion are brought into contact with the cutting insert.

16. The tool body according to claim 15, wherein at least a part of the operating member is exposed to the second surface side.

17. The tool body according to claim 15, wherein in a state where the clamp member binds the cutting insert, the clamp member includes a protruding portion located closer to the first surface side than a bottom surface of the cutting insert and an embedded portion located closer to the second surface side than the bottom surface,
the hook portion is provided on the protruding portion,
a tail portion protruding toward an opposite side to the hook portion, when seen from the first surface side, is provided on the embedded portion, and
the insert mounting seat has a pocket which accommodates the embedded portion, and an inclined surface which supports the tail portion is formed in the pocket.

18. The tool body according to claim 16, wherein in a state where the clamp member binds the cutting insert, the clamp member includes a protruding portion located closer to the first surface side than a bottom surface of the cutting insert and an embedded portion located closer to the second surface side than the bottom surface,
the hook portion is provided on the protruding portion,
a tail portion protruding toward an opposite side to the hook portion, when seen from the first surface side, is provided on the embedded portion, and
the insert mounting seat has a pocket which accommodates the embedded portion, and an inclined surface which supports the tail portion is formed in the pocket.

19. The tool body according to claim 17, wherein the tail portion is constituted by a part of a columnar surface or a part of a spherical surface at a portion supported by the inclined surface.

20. The tool body according to claim 18, wherein the tail portion is constituted by a part of a columnar surface or a part of a spherical surface at a portion supported by the inclined surface.

* * * * *